J. DE LISLE.
APPARATUS FOR MAKING AND PACKAGING BUTTER.
APPLICATION FILED FEB. 15, 1909.
943,603.
Patented Dec. 14, 1909.
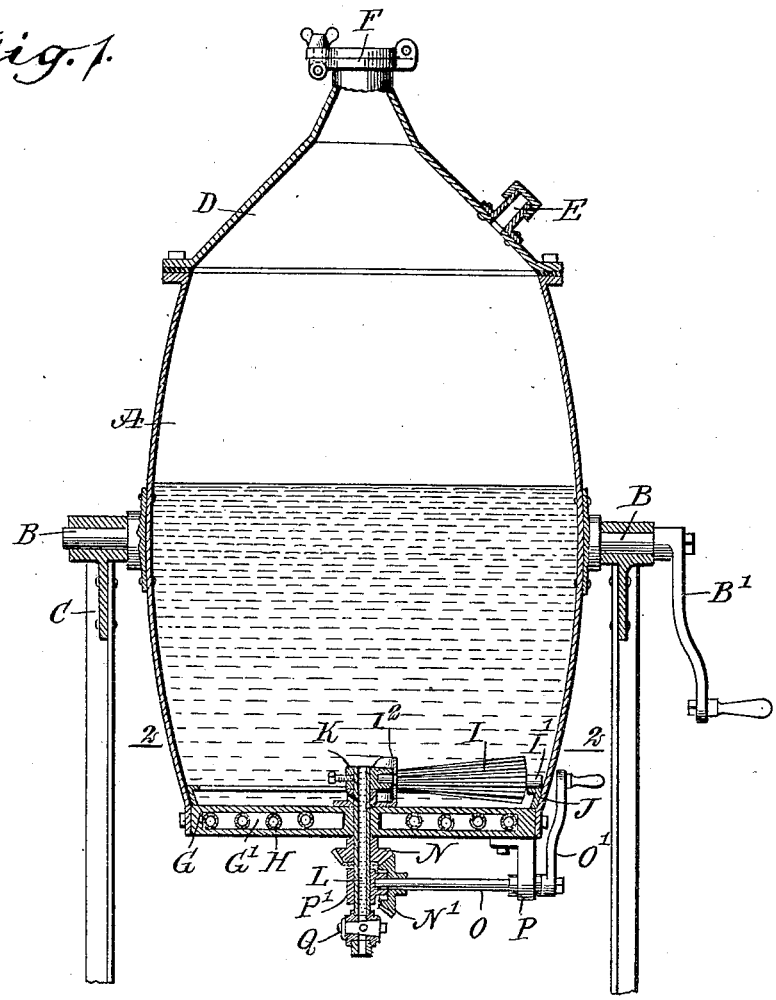
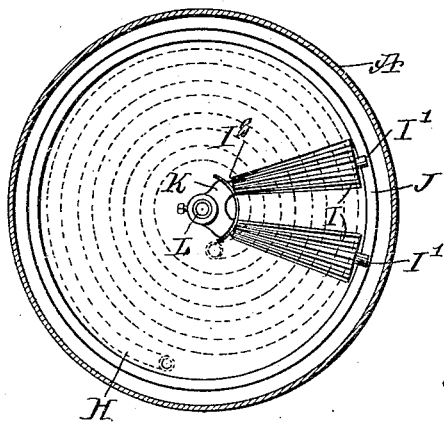
WITNESSES
INVENTOR
Justin de Lisle
BY
ATTORNEYS

UNITED STATES PATENT OFFICE.

JUSTIN DE LISLE, OF NEW YORK, N. Y.

APPARATUS FOR MAKING AND PACKAGING BUTTER.

943,603.  Specification of Letters Patent. Patented Dec. 14, 1909.

Application filed February 15, 1909. Serial No. 477,869.

*To all whom it may concern:*

Be it known that I, JUSTIN DE LISLE, a citizen of the United States, and a resident of the city of New York, borough of Manhattan, in the county and State of New York, have invented a new and Improved Apparatus for Making and Packaging Butter, of which the following is a full, clear, and exact description.

The object of the invention is to provide a new and improved apparatus for making and packaging butter aseptically, that is, absolutely free of microbes liable to produce fermentation or putrifaction in the butter or disease in the intestines or other organs of the consumer of the butter.

For this purpose the specially prepared cream is agitated in a revoluble churn, to form butter globules, worked or kneaded into a lump by a working or kneading device arranged within the churn and capable of being operated from the outside, the churn having outlets for the discharge of the buttermilk, butter washings and the butter, to allow of packaging the butter in aseptic packages at the butter outlet, the operation being carried on under exclusion of septic influences.

A practical embodiment of the invention is represented in the accompanying drawings, forming a part of this specification, in which similar characters of reference indicate corresponding parts in both views.

Figure 1 is a sectional side elevation of the improvement; and Fig. 2 is a sectional plan view of the same, on the line 2—2 of Fig. 1.

The vessel A of a revoluble churn is preferably in the shape of a barrel, and is provided at its sides with trunnions B journaled in suitable bearings arranged on a frame-work or standard C, and one of the trunnions B is provided at one outer end with a crank arm B′ for turning the vessel A over end, as will be readily understood by reference to Fig. 1. The vessel A is closed at one end by a head D, preferably of conical shape, and provided with a normally closed inlet E for introducing the cream into the vessel A, and also for introducing a jet of hot steam or other sterilized fluid into the vessel A for sterilizing the same previous to placing the cream into the vessel. The terminal of the head D is provided with a normally closed butter outlet F, on which can be placed a sterilized package to receive the sterilized butter directly at the outlet F and inclose the same in the sterilized package to keep the butter in sterilized condition until used. The outer end of the vessel A is closed by a head G having, preferably, a chamber G′ in which extends a cooling coil H, adapted to be connected at its ends with a cooling medium supply such as ice water and the like, to cool this end while kneading the produced butter globules into a lump, by a butter working or kneading device arranged within the vessel A adjacent to the head G.

The butter-working or kneading device consists preferably of conical rollers I fluted in the direction of their length and having the outer ends I′ mounted to travel on an annular track J arranged within the vessel A and secured to the same adjacent to the head G. The inner end I² of the rollers I are journaled in a head K secured on the upper end of a hollow shaft L, extending through the head G and carrying at its outer end a bevel gear wheel N in mesh with a bevel gear wheel N′, secured on a shaft O journaled in suitable bearings P and P′, of which the bearing P is secured to the under side of the head G and the bearing P′ is held on the hollow shaft L. On the outer end of the shaft O is secured a crank arm O′ adapted to be taken hold of by the operator, for turning the shaft O, so as to cause the bevel gear wheels N′ and N to turn the shaft L and with it the head K, thereby carrying the rollers I around in the vessel A directly over the head G and at the time the vessel A is held stationary in the vertical position indicated in Fig. 1. Now as the rollers I are carried around they rotate, and in doing so they knead the butter globules into a lump of butter, and as the head G at this time is subjected to the action of a cooling medium passing through the coil H, it is evident that the butter is prevented from adhering to the head G, the rollers I or the vessel A. In the lower outer end of the hollow shaft L is arranged a draw-off cock Q, which when opened by the operator permits discharge of the buttermilk and the wash water contained in the vessel A, as hereinafter more fully described.

In using the churn, the vessel A is first sterilized by introducing hot steam or other suitable sterilizing medium through the inlet E, or by subjecting the whole churn to 300° F. for thirty minutes in an autoclave, and then the sterilized cream, or cream in which a certain desirable microbe has been blended, is introduced into the vessel A through the inlet E and then the latter is closed. The operator now turns the crank arm B' to rotate the vessel A and to cause the cream to be churned into butter globules, and when this has been accomplished the vessel A is held stationary in a vertical position, as indicated in Fig. 1, and the buttermilk is allowed to run off by opening the cock Q, which latter is closed after the buttermilk is drained out. Connection is now made with the coil of pipe H for circulating a cooling medium through the said coil, to cool the lower end of the vessel A and its contents. The operator now turns the crank arm O', so as to cause the kneading device to knead the butter into a lump and to work out the residuary buttermilk. Sterilized ice water is preferably introduced from time to time into the churn by way of the inlet E to wash the butter during the kneading process, and when this operation has been completed the cooling medium is disconnected from the coil H, and the cock Q is opened to allow the residuary buttermilk and the wash water to drain from the vessel A. After the vessel A is free of buttermilk and wash water the cock Q is again closed, and then the vessel A is given a half turn so as to bring the outlet F and the butter to the bottom. Connection is now made by a flexible hose or the like between the pipe L and a source of compressed sterilized air. The outlet is then opened and a sterilized package is applied to the open outlet F to allow the sterilized butter to pass into the package by the force of the compressed sterilized air, and then the package is immediately closed and sealed, thus maintaining the butter in sterilized condition.

From the foregoing, it will be seen that by the arrangement described the cream and the butter are not subjected to septic or other deleterious influences, that is, the butter is produced under aseptic conditions and the butter is immediately packed into a sterilized package as it leaves the churn.

Having thus described my invention, I claim as new and desire to secure by Letters Patent:

1. A churn, comprising a vessel sterilized interiorly and adapted to contain the cream, the vessel being mounted to turn to churn the cream into butter globules, a kneading device within the said vessel for kneading the butter globules into a mass, and separate outlets for the buttermilk and the butter.

2. A churn, comprising a vessel for containing the cream and mounted to turn to churn the cream into butter globules, a kneading device within the said vessel for kneading the butter globules into a mass, and means for cooling the portion of the vessel in which the kneading operation is carried on.

3. A churn, comprising a vessel having trunnions at the sides for turning the vessel over end, a kneading device in one end of the said vessel and capable of being actuated from the outside, and cooling means at the end of the vessel containing the said kneading device for cooling this end of the kneading device.

4. A churn, comprising a vessel mounted to turn and provided at one end with a normally closed outlet for the butter and at the other end with a normally closed outlet for the buttermilk, a kneading device in the said vessel at the buttermilk outlet, and capable of being actuated from the outside of the vessel, and a cooling device for the end of the vessel having the said kneading device.

5. A churn, comprising a vessel mounted to turn, means for cooling one end of the vessel, a buttermilk outlet at the cooled end of the vessel, and a butter outlet at the opposite end of the said vessel.

6. A churn, comprising a vessel mounted to turn, means for cooling one end of the vessel, a buttermilk outlet at the cooled end of the vessel, a butter outlet at the opposite end of the said vessel, and a kneading device in the cooled end of the vessel.

7. A churn, comprising a barrel-shaped vessel provided at its sides with trunnions, the vessel having heads, one of which is provided with a cooling device and the other with a butter outlet, a hollow shaft journaled in the vessel head having the cooling device, and provided with a cock for draining the buttermilk from the vessel, a driving gear connected with the said shaft, and a kneading device connected with the said shaft inside of the vessel.

8. A churn, comprising a barrel-shaped vessel provided at its sides with trunnions, the vessel having heads, one of which is provided with a cooling device and the other with a butter outlet, a hollow shaft journaled in the vessel head having the cooling device and provided with a cock for draining the buttermilk from the vessel, a driving gear connected with the said shaft, a kneading device having a pair of conical fluted rollers within the vessel and operating in conjunction with the said cooled end, a track in the vessel for the outer ends of the rollers to travel on, and a head secured to the said shaft and in which the inner ends of the said rollers are journaled.

9. A churn, comprising a vessel sterilized interiorly and adapted to contain the cream, the vessel being mounted to turn to churn the cream into butter globules, a kneading device within the said vessel for kneading the butter globules into a mass, and separate outlets for the buttermilk and the butter, the said buttermilk outlet being arranged exteriorly for connection with a source of fluid pressure supply to force the butter out of the butter outlet.

10. A churn, comprising a vessel mounted to turn, a kneading device within the said vessel for kneading the butter globules into a mass, a butter outlet on the said vessel, and means for connecting the vessel with a source of fluid pressure supply to force the butter out of the said vessel by way of the said butter outlet.

In testimony whereof I have signed my name to this specification in the presence of two subscribing witnesses.

JUSTIN DE LISLE.

Witnesses:
   THEO. G. HOSTER,
   JOHN P. DAVIS.